Nov. 20, 1934.　　　C. I. McNEIL　　　1,981,738
ELECTRICAL APPARATUS
Filed Jan. 3, 1933
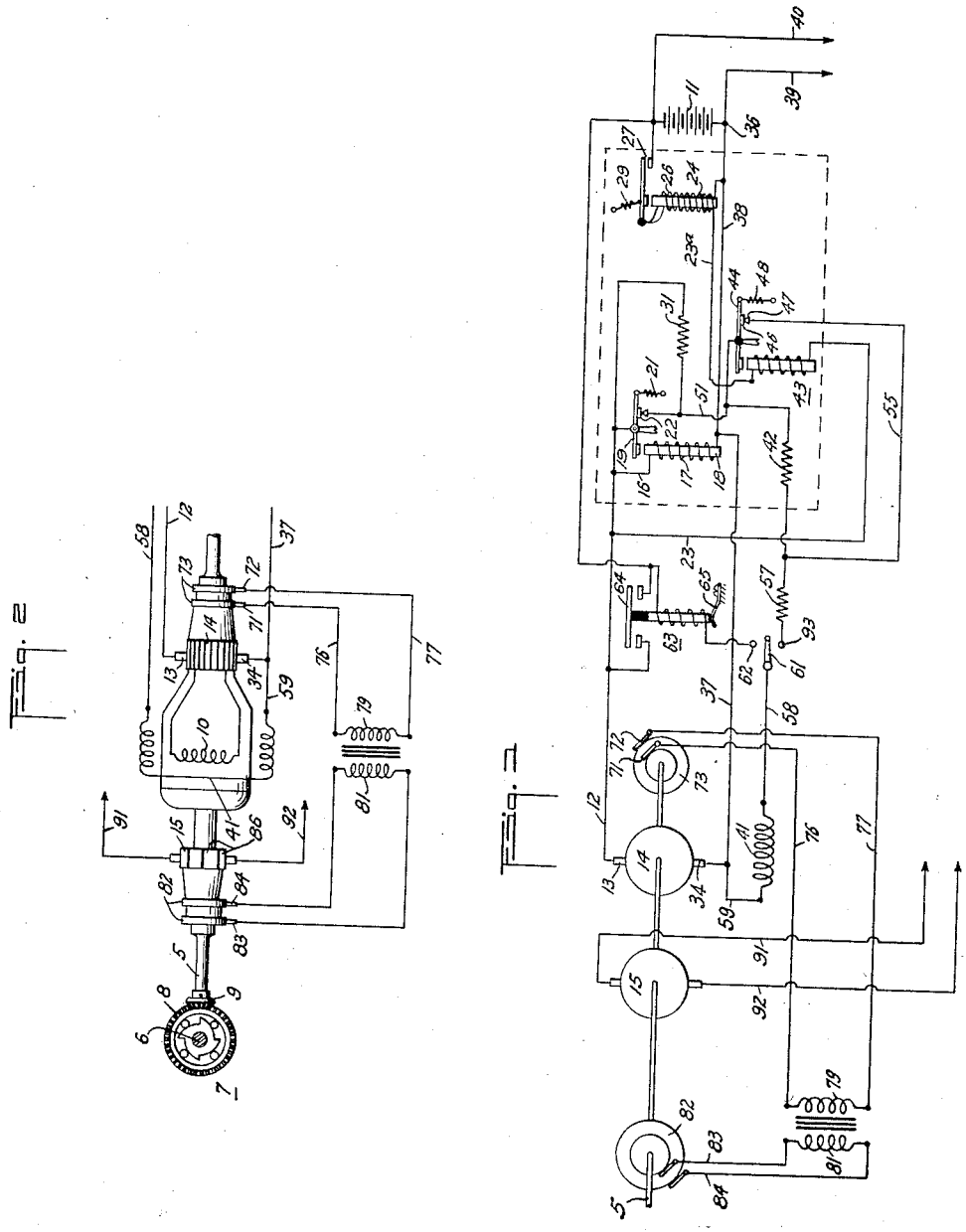
INVENTOR.
Charles I. McNeil
BY Martin J. Finnegan
ATTORNEY.

Patented Nov. 20, 1934

1,981,738

UNITED STATES PATENT OFFICE 1,981,738

ELECTRICAL APPARATUS

Charles I. McNeil, Bloomfield, N. J., assignor, by mesne assignments, to Eclipse Aviation Corporation, East Orange, N. J., a corporation of New Jersey Application January 3, 1933, Serial No. 650,023

3 Claims. (Cl. 171—313)

This invention relates to dynamo electric machines and more particularly to a machine capable of operating as a multiple output generator when mechanically energized, at least one of which outputs may be continued when the machine is electrically energized, and acts as a dynamotor.

An object of the invention is to provide a novel dynamo electric machine of the multiple output type, in which one feature of novelty is the provision of one or more commutators in excess of the number of armature windings.

Another object is to provide, in a dynamo electric machine, a commutator forming a part of the rotor of the machine, but without direct electrical connection with the rotor winding, and yet energizable therefrom to deliver direct current to an external load. In this connection a feature of the invention is the provision of a novel apparatus for obtaining a direct current of relatively high voltage from an armature winding which of itself is insufficient to produce such voltage.

Specifically, the novel combination includes first, means for generating an alternating current of relatively low voltage in an armature winding; secondly, means for transforming said alternating current into one of high voltage, and thirdly, means for rectifying said higher voltage current by periodic reversals occurring in predetermined phase relation to the current generated in said armature winding. In the embodiment shown herein (and merely illustrative of a number of possible structures in which the novel method may be embodied) the steps above outlined are carried out by the use of a plurality of collector rings on the armature shaft of the machine, connected to the primary and secondary windings, respectively, of a step-up transformer, in combination with a rectifying commutator, also on the armature shaft.

In the drawing, Fig. 1 is a schematic representation of the preferred embodiment of the invention as applied to an electrical system including a dynamo electric machine operable either as a generator or dynamotor; and Fig. 2 is a view of the physical outline of the generator-dynamotor of Fig. 1.

Referring to Figs. 1 and 2, the invention is shown as applied to a dynamo electric machine, the armature shaft 5 of which is adapted to be driven from an internal combustion engine or other prime mover having a shaft 6 connecting with the armature shaft 5 through an overrunning clutch 7 and gears 8 and 9, the overrunning type of clutch being employed so that the armature winding 10 may be energized from an independent electrical source 11 when the mechanical driving means 6, 7 is not in use. The electrical characteristics of the machine may be whatever is desired, but when a shunt field is employed, and it is desired to regulate the strength thereof and thus regulate the output, the electrical connections are preferably as indicated in Fig. 1, and include a lead 12 from the positive brush 13 of a commutator 14, disposed at one end of the machine, there being a second commutator 15 at the other end thereof adapted to deliver, by reason of the novel arrangement to be described, a direct current of relatively high voltage, which may be applied to any desired service, as for example, the energization of the circuit of a radio transmitting set.

As above indicated, a lead 12 extends from the positive brush 13 of the relatively low voltage commutator 14, and connects with a conductor 16 representing one end of a shunt coil 17 of a voltage regulating unit comprising an electro-magnet having a core 18 and a rocking armature 19 controlling, in conjunction with the spring 21, the opening and closing of a switch 22. The lead 12 also connects, by means of the extensions 23 and 23a, with the series coil 24 of a reverse current cutout device. This series coil 24 coacts in the usual manner with a shunt winding 26 to hold switch 27 closed more firmly than it could be held by the shunt coil 26 acting alone, and also serves, in the event of a tendency to a reversal in the direction of current flow, to set up a reverse magnetic effect, assisting the spring 29 to open the switch 27. A regulator resistance 31 is shunted directly across the switch 22, for a purpose to be further explained.

The brush 34 of the commutator 14 is connected with the negative terminal 36 of the storage battery 11 through suitable leads 37 and 38, the latter having an extension 39, which, together with the lead 40, constitute the low voltage feeds to the load to be supplied, as for example the filaments of the tubes of a radio transmitting or receiving set.

In addition to the voltage regulating device already described, there may be employed regulating means embodying a current regulator adapted to insert resistance in the field 41 of the machine to control the current output of the latter, said resistance unit being indicated at 42. In the form shown, the current regulator comprises a coil 43 and a pivoted armature 44 carrying a contact 46 which is normally maintained in engagement with a fixed contact 47 by means of spring 48 attached at one end to armature 44 and at its other end to a suitable fixed support. The contacts 46 and 47 are in series, through a lead 51, with the switch 22 of the voltage regulator, and are also in series with the field winding 41, the circuit passing through a lead 55, resistance 57, switch 61 and conductor 58 to the field winding 41, the return feed being shown at 59.

Switch 61 is shown in the open position, but when engaged with the contact 62 it acts to close a circuit to the winding of a relay 63 which is thus energized to close the switch 64 and thus connect the battery 11 with the brush 13 and hence the armature 10, whereby the latter coacts with the field of the machine to convert the direct current taken from the battery into an alternating current delivered to the brushes 71 and 72 engaging the collector rings 73 at one end of the armature shaft 5. These brushes 71 and 72 connect by means of leads 76 and 77 respectively, with the terminals of the primary winding 79 of a step-up transformer, the secondary winding 81 thereof being connected to the collector rings 82 by means of brushes 83 and 84. These collector rings 82 are also mounted on the armature shaft 5, and act to feed the high tension alternating current to the second commutator 15 possessing a plurality of bars 86 equal in number to the number of poles of the machine. The high tension alternating current thus maintains a definite relation to the alternating flux through the poles of the machine, and as the polarity of the high tension alternating current changes from positive to negative, the members 86 act to rectify said current by reversing the connections and thus maintaining an external circuit through the leads 91 and 92 of uniform polarity. A direct current of the desired voltage is thus supplied to the load to be energized, as for example, the plate circuit of a radio transmitting or receiving set, without the necessity of employing a second armature winding about the shaft 5.

When the mechanical driving means is employed, the switch 61 is shifted to the contact 93, thereby de-energizing relay 63 and allowing contact 64 to be opened by a spring 65 or any other suitable means, and thus discontinue the drawing of current from the battery 11. It will be seen therefore, that the operation of generating the low voltage alternating current and then rectifying said current will proceed in the same manner whether the shaft 5 is rotated mechanically or electrically.

There is thus disclosed a novel apparatus possessing the characteristics above recited and the potentialities for achieving the objects of the invention above set forth.

While the embodiment of the invention illustrated in the drawing has been described with considerable particularity, it is to be expressly understood that the invention is not restricted thereto, as the same is capable of receiving a variety of expressions, some of which will now readily suggest themselves to those skilled in the art. Reference will therefore be had to the appended claims for a definition of the limits of the invention.

What is claimed is:

1. In combination with a dynamo electric machine having a plurality of sets of low and high voltage terminals and a shunt field winding, a transformer having primary and secondary windings connected respectively to the low and high voltage terminals of one set, means for generating current in said machine to be fed to said transformer through the intermediary of said low voltage terminals and then fed back to the machine for delivery at other of said high voltage terminals, said last named means comprising a battery and a switch for electrically connecting said battery with other of said low voltage terminals, an electro-magnet controlling the closure of said switch, and means for inserting said electro-magnet in the circuit which includes said shunt field winding.

2. In combination with a dynamo electric machine having a plurality of sets of low and high voltage terminals and a shunt field winding including voltage regulating means, a transformer having primary and secondary windings connected respectively to the low and high voltage terminals of one set, means for generating current in said machine to be fed to said transformer through the intermediary of said low voltage terminals and then fed back to the machine for delivery at other of said high voltage terminals, said last named means comprising a battery and a switch for electrically connecting said battery with other of said low voltage terminals, an electro-magnet controlling the closure of said switch, and means for inserting said electro-magnet in the circuit which includes said shunt field winding, said inserting means comprising a second switch which serves normally to connect said field winding with said voltage regulating means.

3. In combination with a dynamo electric machine having a plurality of sets of low and high voltage terminals and a shunt field winding including voltage regulating means, a transformer having primary and secondary windings connected respectively to the low and high voltage terminals of one set, means for generating current in said machine to be fed to said transformer through the intermediary of said low voltage terminals and then fed back to the machine for delivery at other of said high voltage terminals, said last named means comprising a battery and a switch for electrically connecting said battery with other of said low voltage terminals, an electro-magnet controlling the closure of said switch, and means for inserting said electro-magnet in the circuit which includes said shunt field winding, said inserting means comprising a second switch which serves to connect said field winding with said voltage regulating means when the battery is not delivering current to said low voltage terminals.

CHARLES I. McNEIL.